Aug. 15, 1967    W. F. KLEMM ET AL    3,335,748
ADJUSTABLE CONTROL FOR METERED FLOW
Filed Sept. 15, 1964    3 Sheets-Sheet 1

INVENTORS
WILLIAM F. KLEMM
HANS ALBER
BY
James and Franklin
ATTORNEYS

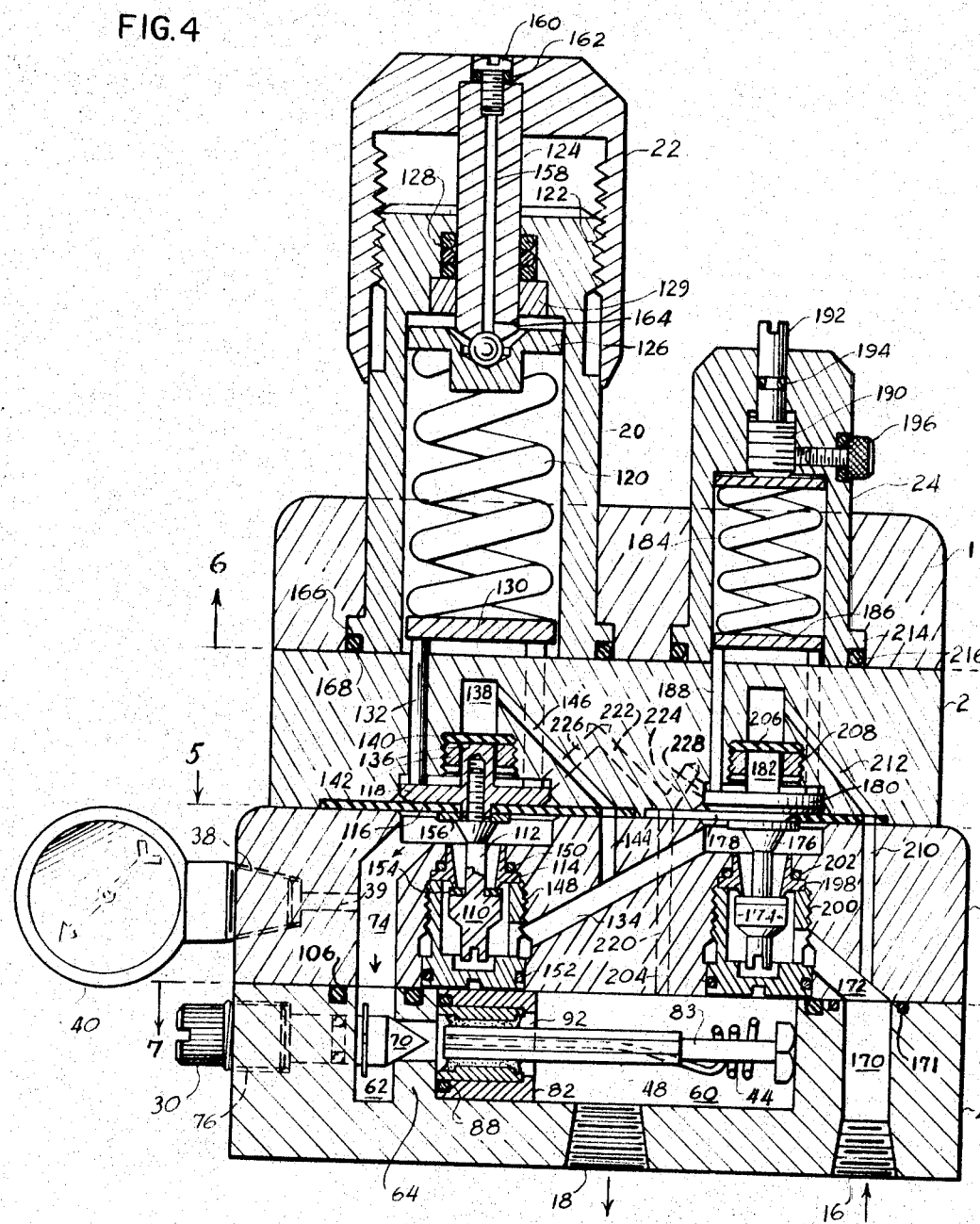

Aug. 15, 1967     W. F. KLEMM ET AL     3,335,748
ADJUSTABLE CONTROL FOR METERED FLOW
Filed Sept. 15, 1964     3 Sheets-Sheet 3
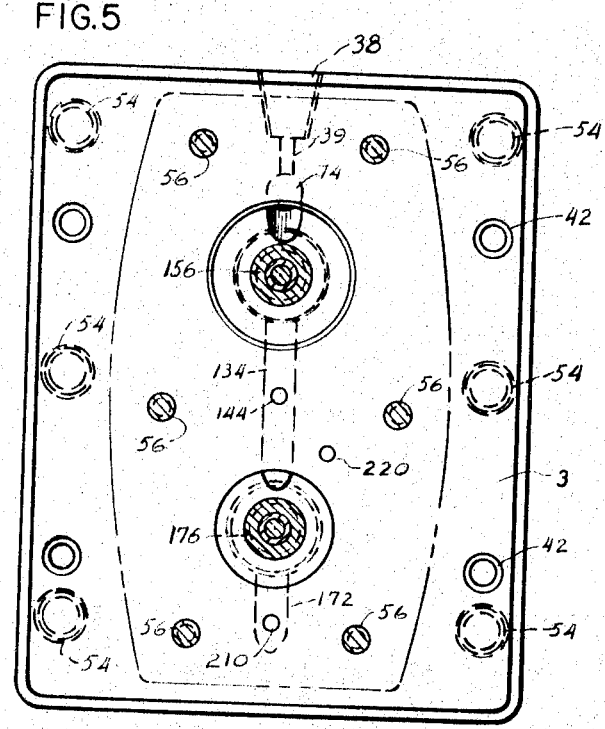
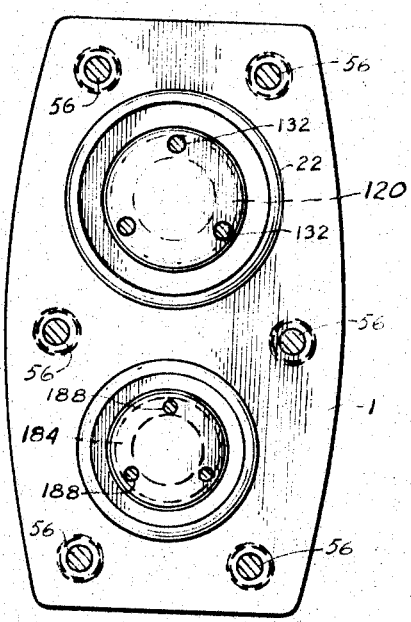
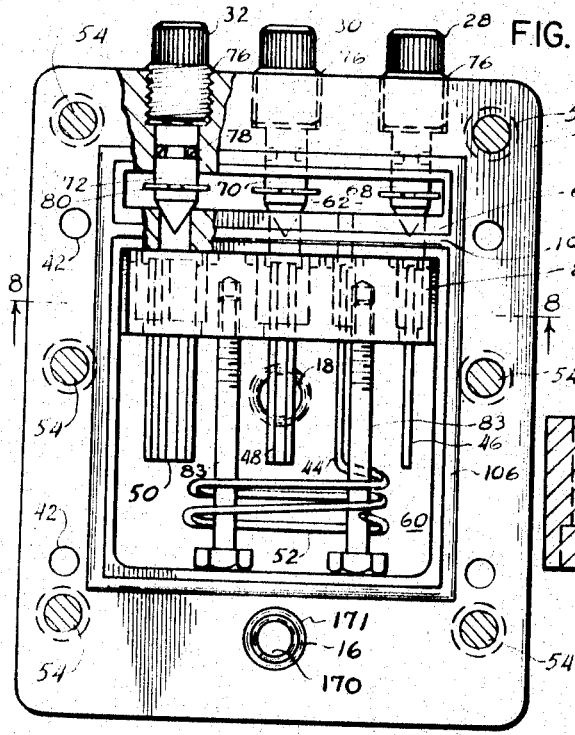
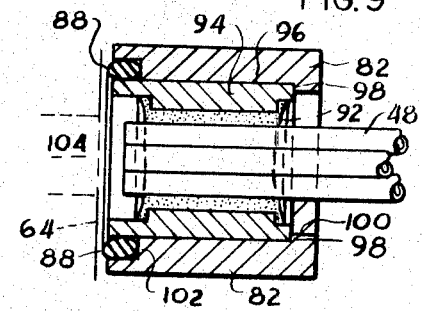
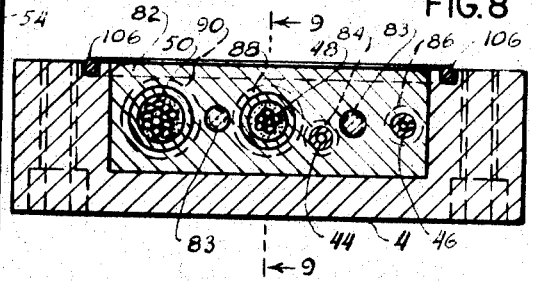
INVENTORS
WILLIAM F. KLEMM
HANS ALBER
BY *James and Franklin*
ATTORNEYS

3,335,748
ADJUSTABLE CONTROL FOR METERED FLOW
William F. Klemm, Nutley, and Hans Alber, Mountainside, N.J., assignors of one-third to Henry B. Peter, Union, N.J.
Filed Sept. 15, 1964, Ser. No. 396,527
18 Claims. (Cl. 137—501)

This invention relates to flow controls, and more particularly to an adjustable flow control for metered flow of a fluid.

Heretofore it has been the practice to use a needle valve or equivalent constriction to provide a restricted passage for a regulated flow of fluid. However, such a constricted passage is readily clogged by small dirt particles, and has other disadvantages. In our prior application, Ser. No. 355,997, filed Mar. 27, 1964, and entitled, Adjustable Flow Control for Metered Flow of Fluid, we employ a friction tube of large enough bore to avoid clogging, but long enough to produce a desired pressure drop. We combine such a restrictor with a manually adjustable pressure regulator, thereby making it feasible to accurately vary the rate of flow in small increments.

The general object of the present invention is to improve the adjustable flow control device disclosed in said prior application.

The restrictor there disclosed has only a limited range upward, and to extend the range or maximum flow we there employed a bypass valve. Such a bypass valve successfully increases the flow and greatly extends the range, but the accuracy of adjustment is in no way comparable with that obtainable when using the restrictor. Accordingly, a more specific object of the present invention is to greatly extend the range of adjustment, while maintatining the desired accuracy of regulation. For this purpose we provide a plurality of restrictors of widely different range, with shut-off valves, so that a desired one or more of the restrictors may be made operative.

In accordance with a further feature and object of the invention, we have devised a restrictor comprising a cluster of collateral restrictor tubes which are arranged for parallel flow, and which thereby provide a high but controllable rate of flow dependent on the regulated supply pressure.

In accordance with a further feature the adjustable pressure regulator preferably is supplemented by a preliminary pressure regulator which reduces the supply pressure to a uniform desired working pressure. A still further object is to provide internal passages connecting the outlet of the flow control device to the low pressure side of the adjustable pressure regulator and the preliminary pressure regulator, so that the regulators are subjected to a differential pressure, and their action is made independent of the outlet pressure.

Inasmuch as the present flow control unit is designed to handle a relatively rapid flow in its upper range, and inasmuch as this requires a fairly large valve opening, the desired precise adjustment and operation of the regulators may be adversely affected by pressure exerted on the valve plug against the valve seat. A further object of the present invention is to overcome this difficulty, which is done, in effect, as though extending the valve stem to form a plunger on the opposite side of the seat, and providing an equalization passage from beneath the seat to the end of the plunger, thereby compensating for the pressure exerted on the plug at the seat.

Another object of the invention is to provide all of the foregoing elements in compact and rugged structural form, using parts which may be manufactured at moderate cost.

To accomplish the foregoing general objects, and other more specific objects which will hereinafter appear, our invention resides in the adjustable flow control device, and the elements thereof, and their relation one to another, as are hereinafter more particularly described in the following specification. The specification is accompanied by drawings, in which:

FIG. 4 is a longitudinal section drawn to larger scale, and taken approximately on the line 4—4 of FIG. 1;

FIG. 5 is a horizontal section taken approximately on the line 5—5 of FIG. 4;

FIG. 6 is a horizontal section taken approximately on the line and in the direction of the arrows 6—6 of FIG. 4;

FIG. 7 is a horizontal section taken on the line 7—7 of FIG. 4;

FIG. 8 is a vertical section taken approximately on the line 8—8 of FIG. 7; and

FIG. 9 is a fragmentary section drawn to enlarged scale and taken approximately on the line 9—9 of FIG. 8.

Figure 1:
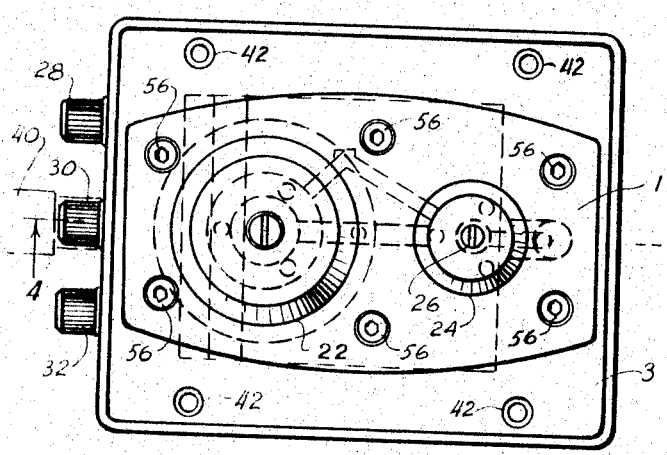
FIG. 1 is a plan view of an adjustable flow control device employing features of our invention.
Figure 3:
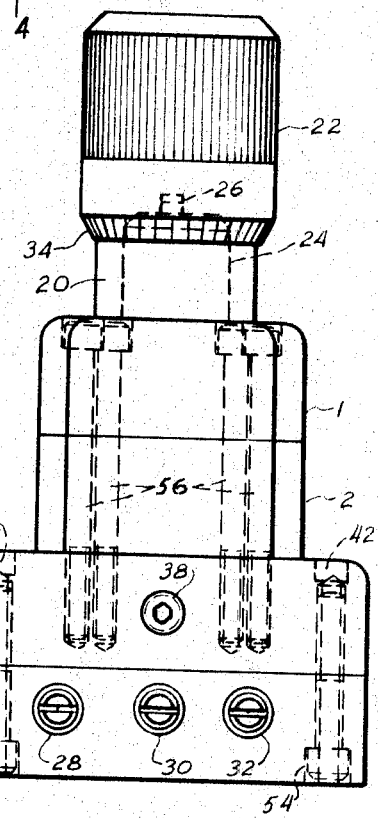
FIG. 3 is an end view of the same.
Figure 2:
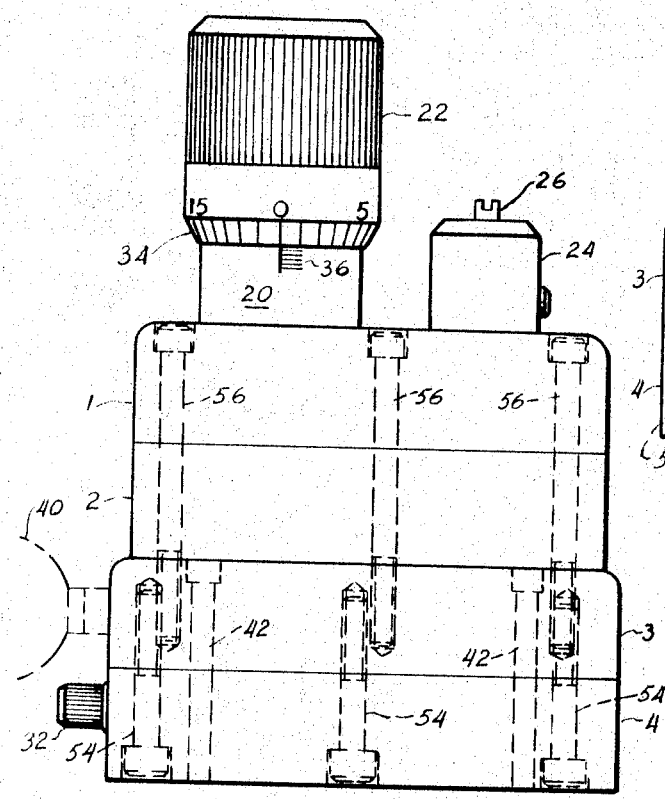
FIG. 2 is a front elevation of the same.

Referring to the drawing, and more particularly to FIGS. 1, 2, and 3, the adjustable flow control mechanism is housed in a block-like body built up of four superposed plates marked 1, 2, 3, and 4. Plates 1 and 2 may be reduced in area relative to plates 3 and 4, as shown, but that is not essential. The plates 3 and 4 are clamped together with an appropriate gasket therebetween, by means of six assembly screws 54 which pass upward through plate 4 and are screwed into plate 3. Plates 1 and 2 are clamped together and to plate 3, by means of six screws 56 which pass downward through plates 1 and 2 and are threadedly received in plate 3. The resulting body has an inlet passage and an outlet passage, internally threaded to receive conventional pipe connections, but these passages are located at the bottom and are not visible in FIGS. 1, 2, and 3. They are shown at 16 and 18 in FIGS. 4 and 7.

The flow control unit comprises an adjustable pressure regulator generally designated 20, this being adjusted by means of a control knob 22. This preferably is preceded by a preliminary pressure regulator which is generally designated 24, and which may be adjusted by means of a screw, the exposed end of which is indicated at 26. These regulators control the pressure of the fluid supplied to one or more restrictors of different flow range. The supply of fluid to the individual restrictors may be controlled by a plurality of shut-off valves, preferably and most simply operated manually, and having valve stems the control ends of which project from the valve body, as indicated at 28, 30 and 32.

The adjustment of the control knob 22 is aided by a scale, preferably resembling a micrometer scale in having gradations around the knob, indicated at 34, and an axial scale 36 (FIG. 2) along the stationary cylindrical body 20. However, as is explained in our prior patent application above referred to, the adjustment may be guided with the aid of a pressure gauge showing the actual pressure between the regulator and the restrictor. The location of such a gauge is indicated at 38 in FIG. 3, and a gauge is indicated in broken lines at 40 in FIG. 1 and FIG. 2. In FIG. 3 it is assumed that connection 38 is closed by a suitable screw plug, but by removal of the plug the gauge may be added. In FIG. 4, the gauge 40 is shown in solid lines, and it may be turned to face in what ever direction may be desired. (The gauge 40 needs a differential pressure connection when the outlet 18 is not at atmospheric pressure.)

In FIGS. 1 and 2 the four open holes 42 may be used for mounting screws which mount the valve body on the frame or structure of some larger machine, for example, a machine tool the rate of feed movement of which may be controlled by the illustrated flow control unit.

Referring now to FIG. 7, the present device employs four restrictors, indicated at 44, 46, 48, and 50. As here illustrated, restrictor 44 is a single long tube, coiled at 52; the restrictor 46 is a single short tube; the restrictor 48 is a small cluster of collateral tubes; and the restrictor 50 is a larger cluster of collateral tubes. By reference to FIG. 8, it will be seen that in the present case the cluster 48 comprises six tubes, and the cluster 50 comprises twelve tubes, these being arranged for parallel flow. The use of such a group or cluster of tubes used for parallel or simultaneous flow constitutes an important feature of the invention. (The term "parallel" is here used as in electrical diagrams, in contradistinction to "series," and does not mean that the tubes are physically parallel, although that too is convenient for compactness.)

It should be understood that a cluster of tubes is not equivalent to a single tube having the combined cross-sectional area, for obviously the single large tube would lack adequate surface area and frictional resistance to flow. It might be though that a single tube of intermediate diameter would result in the same flow, but such is not the case when seeking to work over a range of flow by means of pressure adjustment. If such a single tube were designed to work at a high supply pressure of say one hundred pounds per square inch, there would be no significant pressure drop at a low supply pressure of say five p.s.i. A single tube of greater diameter and much greater length might have significant pressure drop at say five p.s.i. supply pressure, but then there would be insufficient increase in liquid flow at the upper end of the pressure range, say at one hundred p.s.i. supply pressure. In the present case the tube diameter may be say 0.046 inch; and with six tubes each having a length of one and one-half inches, the flow through the restrictor may range all the way from say thirty cubic inches per minute at five pounds pressure to say four hundred eighty cubic inches per minute at one hundred pounds pressure.

Thus, one important advantage of a cluster restrictor is that it provides a wide flow range relative to the adjustable pressure range. Another advantage is compactness. A flow control having the overall range of the present flow control, but not using clusters, would require a housing block of large volume, filled with long coils of tubing. Other advantages are ease of manufacture; accuracy of flow; and adaptability to change in viscosity of fluid (by change of pressure adjustment, this being a corollary to the advantage of wide range previously mentioned).

Referring now to FIGS. 4 and 7, the bottom plate 4 is hollowed to provide a relatively large restrictor chamber 60, and a smaller valve chamber 62, these being separated by a wall or partition 64. The partition 64 has four horizontal valve passages drilled therethrough and leading to the four restrictors, three of said passages being aligned with the valve stems 68, 70 and 72. The fourth passage (that leading to the minimum flow restrictor 44 could have a shut-off valve, but in the present device it has none). Its flow is so small that it is simply added when another restrictor is used. The fluid from the adjustable pressure regulator flows downward to the valve chamber 62 through a passage best shown at 74 in FIG. 4.

In FIG. 4, it will be seen how pressure gauge 40, if used, is received at 38, and communicates through a horizontal passage 39 with the main upright passage 74 between the adjustable pressure regulator and the shut-off valve chamber.

The valve stems are threaded at 76 for opening or closing movement, and have smooth shanks which are sealed by means of O-rings 78. Each valve stem is additionally provided with a stop flange 80 to guard against accidental total release of the valve stem at the screw 76. The stop flange is most simply provided by grooving the valve stem and applying a snap ring in the groove. The outer end of each valve stem is slotted or otherwise arranged for tool operation, but in addition may be ridged or knurled, as indicated in the drawing, to facilitate manual rotation.

The restrictors may be flow connected to the valve passages in different ways. In the present and preferred construction, the restrictor tubes are soldered in bushings which are slidably received in a common header 82 (FIG. 7) which is forced against the partition 64 by means of two push screws 83. The heads of the push screws bear against the remote end of the restrictor chamber 60. The ends of the push screws are threadedly received in the header 82, and by backing the screws out of the header, the latter is forced against the partition wall 64.

The fit against the partition wall is sealed by four O-rings, one for each restrictor. These are indicated in FIG. 8 by O-ring 84 for restrictor 44; O-ring 86 for restrictor 46; O-ring 88 for restrictor 48; and O-ring 90 for restrictor 50.

The inlet ends of the restrictor tubes are preliminarily soldered in cylindrical bushings, which later are slid into receptive sockets in the header. This construction may be explained with reference to FIG. 9, in which the collateral tubes 48 are embedded in solder 92 filling a bushing 94. The ends of the bushing are preferably recessed for ease in performing the soldering operation. The header 82 has a cylindrical socket at 96 which slidably receives the bushing 94, and the latter bottoms on a shoulder or step 98. The opening 100 through the header is more than large enough to receive the entire cluster of tubes. The header 82 is additionally provided with an annular step at 102 to receive the O-ring 88, which then is compressed against the partition wall, indicated in broken lines at 64. This wall has the aligned valve passages one of which is suggested in broken lines at 104. It will be seen that the O-ring seals in two directions. It seals the bushing 94 to the header 82, in radial direction, and it seals both to the partition 64 around the valve passage 104, in axial direction.

The single tube restrictors 44 and 46 are similarly soldered in a bushing which is received in the header, but the bushings are smaller in diameter. They are similarly stepped or recessed at the ends to facilitate the soldering operation.

In the particular case here illustrated the first restrictor 44 has a diameter of 0.022 inch and is ten inches long. The second restrictor 46 is 0.030 inch in diameter and is one and one-half inches long. The third restrictor 48 has six collateral tubes which are 0.046 inch in diameter and one and one-half inches long. The fourth restrictor 50 has the same size tubes, but has twelve tubes instead of six. With a pressure range of from five to one hundred pounds provided by the adjustable pressure regulator 20, the flow range may extend all the way from a minimum of say 0.04 cubic inch per minute to a maximum of about 1471 cubic inches per minute, using ordinary hydraulic oil.

In the specific example and with the specific dimensions given above the first restrictor 44 provides a low flow range of from 0.04 to 1.0 cubic inch per minute with an adjustable supply pressure from 5 to 100 p.s.i., while using hydraulic oil of ordinary quality and filtration. The second restrictor 46 has a flow range of from 0.77 to 30 cubic inches per minute when varying the supply pressure from 5 to 100 p.s.i. Inasmuch as the present structure is simplified by not providing a shut-off valve for the first restrictor, the resulting flow when shut-off valve 28 is opened is the sum of the first and second restrictors, so that the range then is from 0.81 to 31 cubic inches per minute. The flow range for the third restrictor is from 30 to 480 cubic inches per minute when varying the supply pressure from 5 to 100 p.s.i., and therefore by shutting the valve 28 and opening the valve 30, the flow range is changed to extend from 30.04 to 481 cubic inches per minute. The fourth restrictor has a flow range of from 60 to 960 cubic inches per minute when the supply pressure is varied from 5 to 100 p.s.i., and therefore by shutting the valve 30 and opening the valve 32 the flow range extends from 60.04 to 961 cubic inches per minute. By opening both valves 28 and 30, the flow range extends from 30.81 to 511 cubic inches per minute. By closing valve 28 and opening valves 30 and 32, the flow range is from 90.04 to 1441 cubic inches per minute. By opening all of the valves the flow range is from 90.81 to 1471.

Different ranges may be provided by changing the bore and/or length of the restrictor tubes, and also by changing the number of restrictor tubes in a cluster. It will therefore be understood that the quantitative tube dimensions and pressure values and flow rates mentioned above have been given solely by way of example, and are not intended to be in limitation of the invention.

The open tops of the restrictor chamber 60 and the valve chamber 62 are closed by the superposed plate 3, and this closure is sealed by a special gasket which is rectangular to surround both chambers, as shown at 106 in FIG. 7, and which also has a cross-bar at 108 formed integrally therewith and serving to seal one chamber from the other. The top of plate 4 is preferably grooved or channeled to receive this gasket 106, 108, as shown in FIGS. 7 and 8. Alternatively, the bottom of plate 3 could be channeled to locate the gasket.

The adjustable pressure regulator 20 may be described with reference to FIG. 4. It comprises a valve plug 110 on a valve stem 112 and bearing upward against a valve seat 114. The valve stem carries a main diaphragm 116 which is backed up by a large area piston-like diaphragm support 118. The latter is urged downward by a main compression spring 120 received in housing 20, and the force of which is adjusted by means of the large knob 22. Knob 22 is internally threaded and engages a thread 122 on the upper end of fixed housing 20. The knob carries a push rod 124, the lower end of which bears on a spring seat 126 through a hardened ball, the spring seat 126 acting also as a ball seat. The push rod 124 passes through the upper end of housing 20 and is there sealed by means of O-rings 128 held by a plug 129 which may be held by a force fit in housing 20. The lower end of spring 120 bears on a lower spring seat 130, the force of which is transmitted to the diaphragm support 118 by means of a plurality (in this case three) push rods 132.

Fluid is admitted to the lower or inlet chamber of the valve beneath valve plug 110 by means of a sloping passage 134. The discharge of the regulator valve is applied to the flexible diaphragm 116, and flows through the downward passage 74 previously referred to, which passage leads directly into the common inlet chamber 62 of the row of shut-off valves.

The diaphragm support 118 has a cylindrical upward projection or plunger 136 which is coaxial with and may be considered to be an extension of the valve stem. It fits slidably in an equalization cylinder 138, and preferably is acted on through a flexible sealing disc 140, the latter being secured in position by a threaded bushing 142. The cross-sectional area of the cylinder 138 is selected to match that of the opening in the valve seat 114. An equalization passage is provided leading from beneath the valve seat, to the cylinder 138, or, differently expressed, to the upper end of the movable plunger 136, in order to compensate for the pressure exerted on the valve plug 110 at the seat. In the present case, this connecting passage is formed by the lower part of the sloping hole 134 and a vertical hole 144 and another sloping hole 146 leading to the cylinder 138 above the plunger 136.

The valve seat may be locked in position by means of a threaded cup shaped seat lock 148. An O-ring 150 may be provided between the valve seat 114 and the receptive hole in plate 3. Another O-ring 152 may be provided between the lower closed end of the seat lock 148 and plate 3. The lower end of the seat lock may be slotted or otherwise arranged to receive a wrench to tighten the seat lock.

The valve plug 110 may be surfaced with appropriate gasket material, indicated at 154. The upper end of valve stem 112 may be threadedly connected to the diaphragm support 118 and the plunger 136. A washer 156 may be provided beneath the diaphragm 116. The seat lock 148 is apertured at one side to register with the lower end of sloping passage 134. The use of the three push rods 132 which are offset from the axis of the valve stem provides access to the equalization plunger 136, which plunger is on the axis of the valve stem and functions as an extension of the valve stem.

The diaphragm 116 has a relatively large diameter, and is clamped between plates 2 and 3 when the plates are assembled. The diaphragm is apertured at the upper end of the equalization hole 144, and thus, the large diameter diaphragm serves also to seal the equalization passage. However, we have also made this device with a smaller diameter diaphragm, and with a separate O-ring located outside the periphery of the diaphragm for sealing the equalization passage. When a smaller diameter diaphragm is used its periphery may be thickened and shaped convexly, somewhat like an O-ring, thereby increasing the flexibility of the diaphragm.

The push rod 124 of the adjusting knob 22 preferably has an axial bore 158 which is closed at the top by means of a screw 160 and seal 162. This screw may be removed to bleed air from the unit when the system is first set up. One or more radial passages may be provided at 164 leading around the ball to the axial passage 158.

In the structure here shown, the cylindrical housing 20 is formed separately from top plate 1. The housing 20 is forced into position, and has a flange 166 to prevent upward movement. An annular channel is formed beneath flange 166 and is used to receive an O-ring 168 which seals both radially and axially.

The preliminary pressure regulator is largely similar in construction to the adjustable pressure regulator, but may be made smaller in dimension, and is less easily adjustable. The main inlet 16 leads to a vertical passage 170 through plate 4, and O-ring 171, and thence to a sloping passage 172 in plate 3, which leads to the lower or inlet chamber of the preliminary pressure regulator. As before, there is a valve plug 174, on a valve stem 176, connected to a diaphragm 178, backed up by a diaphragm support 180, formed integrally with a plunger 182. The main spring 184 is received in a cylindrical housing 24, and bears at its lower end against a spring seat 186, the force of which is transmitted through three push rods 188 to the diaphragm support 180.

The spring pressure may be adjusted by means of an adjusting screw 190, the projecting end 192 of which is preferably reduced in diameter so that it is impossible to accidentally unscrew the part 190 too far. This is done because the pressure therebeneath may be in some cases quite high, keeping in mind that the pressure at inlet 16 may be several thousand pounds per square inch. The shank 192 of the adjusting screw may be sealed by means of an O-ring 194. If desired a bleed screw may be provided at 196, to bleed air from the system as previously mentioned.

As before, the valve seat 198 may be held in position by means of a cup shaped seat lock 200. Seat 198 is sealed in plate 3 by O-ring 202, and the lower end of seat lock 200 is sealed in plate 3 by O-ring 204. The large diameter diaphragm 178 is clamped between plates 2 and 3. The upper end of the equalization plunger 182 is sealed by means of a small diaphragm 206 held by a threaded bushing 208. The equalization passage comprises a vertical hole 210 through plate 3 communicating with a sloping hole 212 in plate 2, the latter leading to the cylinder above the end of plunger 182 and its seal 206. The main diaphragm 178 has a hole between the passages 210 and 212, but here again, the diaphragm may be made much smaller in diameter, and a separate O-ring then used between passages 210 and 212.

The housing 24 is formed separately from plate 1. It is forced upward through plate 1, and is held against additional movement by an annular flange 214. It is sealed by an O-ring 216 which seals both radially and axially.

It may be mentioned that for quantity manufacture, both housings 20 and 24 may be cast integrally with plate 1, instead of being made separately and assembled thereto as here shown.

In FIG. 4 it will be seen that the outlet 118 is a threaded passage leading directly to the restrictor chamber 60. The ends of all of the restrictor tubes are open, and are located in the chamber 60, so that the discharge from any or all of the restrictor tubes flows through the outlet 18.

The main flow path is from inlet 16 through passages 170 and 172 to the preliminary pressure regulator. The flow then is upward but continuous downward through sloping passage 134 to the adjustable pressure regulator, the upward discharge of which then flows downward through passage 74 to the common chamber 62 of the shut-off valves. The flow then is through one or more restrictors to the restrictor chamber 60, and thence downward through the outlet 18.

The flow control device preferably is provided with additional passages connecting the low pressure side of the regulators to the outlet 18, so that the regulators will be subjected to a differential pressure, and their action then will be independent of the absolute pressure. This makes the flow control usable to "meter in" to an actuator or the like, instead of being limited to "metering out" from an actuator. Differently expressed, although the unit functions in response to a pressure range adjustable from say five to one hundred pounds, it may nevertheless deliver hydraulic fluid at a working pressure of hundreds of pounds or even thousands of pounds, per square inch. The differential pressure arrangement also avoids error due to a change in flow resistance beyond the outlet of the present unit.

For this purpose, plate 3 (FIG. 4) has a vertical hole 220 communicating at its lower end with the restrictor chamber 60, which of course is at the outlet pressure. The upper end of vertical hole 220 leads to sloping holes 222 and 224 in plate 2. Hole 222 intersects an oppositely sloping hole 226, which connects above diaphragm 116. Similarly, hole 224 intersects an oppositely sloping hole 228 which connects above diaphragm 178. In this way, the outlet pressure is balanced on both sides of the diaphragm, and the latter then responds solely to the differential working pressure.

The adjustment of pressure regulator knob 22 need not necessarily be manual. It may be motor operated under a remote control or "slave" system.

Similarly the operation of the shut-off valves 28, 30, and 32 need not necessarily be manual, and they could be motor operated under remote control.

It is believed that the construction and method of assembly, as well as the operation and advantages of our improved adjustable flow control device, will be apparent from the foregoing detailed description. In the particular example illustrated it affords flow control over a very wide range, from a minimum of only a few hundredths of a cubic inch per minute, to a maximum of nearly 1500 cubic inches per minute. It uses hydraulic fluid of ordinary quality and filtration, without danger of clogging. The structure is compact and rugged. The adjustment is gradual and dependably reproducible.

It will be understood that while we have shown and described the invention in a preferred form, changes may be made without departing from the scope of the invention, as sought to be defined in the following claims. In the claims, the reference to a plurality of shut-off valves is not intended to exclude the simpler case of a unit having two restrictors and a single shut-off valve for one of them.

We claim:

1. An adjustable flow control for metered slow flow of fluid, said flow control comprising an adjustable pressure regulator, a plurality of restrictors, and a plurality of manually operable shut-off valves whereby a desired one or more of the restrictors may be connected to the outlet of the pressure regulator while the others are shut, said regulator having a readily operable external control means to adjust the same over a desired pressure range, and said restrictors comprising friction tubes of large enough bore to avoid clogging, and long enough for significant pressure drop through the tubes, the restrictors differing in bore and/or length so as to be operable over different ranges of flow, the rate of flow through any one restrictor or combination of restrictors being adjusted by means of the adjustable pressure regulator.

2. An adjustable flow control for metered slow flow of fluid, said flow control comprising an adjustable pressure regulator, a plurality of restrictors, and a plurality of shut-off valves whereby a desired one or more of the restrictors may be connected to the outlet of the pressure regulator while the others are shut, said regulator having a readily operable external control means to adjust the same over a desired pressure range, some of said restrictors being a cluster of collateral friction tubes, the cluster of tubes being arranged for parallel flow, said clusters differing in dimension for different ranges of flow, the rate of flow through any one restrictor or combination of restrictors being adjusted by means of the adjustable pressure regulator.

3. An adjustable flow control for metered slow flow of fluid, said flow control comprising an adjustable pressure regulator, a plurality of restrictors, and a plurality of manually operable shut-off valves whereby a desired one or more of the restrictors may be connected to the outlet of the pressure regulator while the others are shut, said regulator having a readily operable external control means to adjust the same over a desired pressure range, some of said restrictors being a cluster of collateral friction tubes of large enough bore to avoid clogging but small enough bore to provide a significant pressure drop in a short length of tube, the cluster of tubes being arranged for parallel flow, said clusters differing in number of tubes so as to be operable over different ranges of flow, the rate of flow through any one restrictor or combination of restrictors being adjusted by means of the adjustable pressure regulator.

4. An adjustable flow control for metered slow flow of fluid, said flow control comprising an adjustable pressure regulator, a plurality of restrictors, and a plurality of shut-off valves whereby a desired one or more of the restrictors may be connected to the outlet of the pressure regulator while the others are shut, said regulator having a readily operable external control means to adjust the same over a desired pressure range, and said restrictors comprising friction tubes of large enough bore to avoid clogging, and long enough for significant pressure drop through the tubes, some restrictors differing in bore and/or length for different ranges of flow, some restrictors being a cluster of collateral friction tubes arranged for parallel flow and selected for still different ranges of flow, the rate of flow through any one restrictor or combination of restrictors being adjusted by means of the adjustable pressure regulator.

5. An adjustable flow control for metered slow flow of fluid, said flow control comprising an adjustable pressure regulator, a plurality of restrictors, and a plurality of manually operable shut-off valves whereby a desired one or more of the restrictors may be connected to the outlet of the pressure regulator while the others are shut, said regulator having a readily operable external control means to adjust the same over a desired pressure range, and said restrictors comprising friction tubes of large enough bore to avoid clogging, and long enough for significant pressure drop through the tubes, some restrictors differing in bore and/or length so as to be operable over different ranges of flow, one or more of said restrictors being a cluster of collateral friction tubes of large enough bore to avoid clogging but small enough bore to provide a significant pressure drop in a short length of tube, the cluster of tubes being arranged for parallel flow and providing adequate flow at higher pressures, thereby increasing the range of flow with change of pressure, said clusters differing in number of tubes so as to be operable over different ranges of flow, the rate of flow through any one restrictor or combination of restrictors being adjusted by means of the adjustable pressure regulator.

6. An adjustable flow control for metered slow flow of fluid, said flow control comprising a body having a restrictor chamber, an adjustable pressure regulator in said body having an inlet to receive said fluid and having an outlet leading to a valve chamber separated from said restrictor chamber by a header, a plurality of restrictors comprising friction tubes of large enough bore to avoid clogging and long enough for low rate of flow, said restrictors being housed in said restrictor chamber and each having an inlet end connected to said header and an outlet end opening into said restrictor chamber, said chamber having an outlet to deliver the metered fluid, and a shut off valve system cooperating with said restrictor inlet ends at said header whereby a desired one or more of the restrictors may be connected to the pressure regulator while the other restrictors are shut by said shut off valve system, said regulator having a readily operable external control means for adjusting said pressure regulator over a desired pressure range, the rate of flow through any one restrictor or combination of restrictors for a particular setting of the shut off valve system being adjusted by means of the adjustable pressure regulator.

7. An adjustable flow control as defined in claim 6, in which there is a preliminary pressure regulator adjusted to reduce a supply pressure which may be much greater than the desired working pressure, down to the desired working pressure for delivery to the adjustable pressure regulator, the inlet of said preliminary pressure regulator receiving the fluid, and the outlet of said preliminary pressure regulator being connected to the inlet of said adjustable pressure regulator.

8. An adjustable flow control for metered slow flow of fluid, said flow control comprising a body having a restrictor chamber, an adjustable pressure regulator in said body having an inlet to receive said fluid and having an outlet leading to a valve chamber separated from said restrictor chamber by a header, a plurality of restrictors in said restrictor chamber each having an inlet end connected to said header and an outlet end opening into said restrictor chamber, said chamber having an outlet to deliver the metered fluid, and a plurality of shut-off valves in said valve chamber cooperating with said restrictor inlet ends at said header, whereby a desired one or more of the restrictors may be connected to the pressure regulator while the others are shut, said regulator having a readily operable external control means to adjust the same over a desired pressure range, and said restrictors comprising friction tubes of large enough bore to avoid clogging and long enough for low rate of flow, the restrictors differing in bore and/or length so as to be operable over different ranges of flow, the rate of flow through any one restrictor or combination of restrictors being adjusted by means of the adjustable pressure regulator.

9. An adjustable flow control as defined in claim 8, in which there is a preliminary pressure regulator adjusted to reduce a supply pressure which may be much greater than the desired working pressure, down to the desired working pressure for delivery to the adjustable pressure regulator, the inlet of said preliminary pressure regulator receiving the fluid, and the outlet of said preliminary pressure regulator being connected to the inlet of said adjustable pressure regulator.

10. An adjustable flow control as defined in claim 4, in which there is a preliminary pressure regulator adjusted to reduce a supply pressure which may be much greater than the desired working pressure, down to the desired working pressure for delivery to the adjustable pressure regulator, the inlet of said preliminary pressure regulator receiving the fluid, and the outlet of said preliminary pressure regulator being connected to the inlet of said adjustable pressure regulator.

11. An adjustable flow control as defined in claim 10, in which the low pressure side of the adjustable pressure regulator, and the low pressure side of the preliminary pressure regulator, are connected to the outlet of the flow control, so that the regulators are subjected to a differential pressure and their action is independent of the absolute pressure.

12. An adjustable flow control as defined in claim 6, in which the low pressure side of the adjustable pressure regulator is connected to the outlet of the flow control, so that the regulator is subjected to a differential pressure and its action is independent of the absolute pressure.

13. An adjustable flow control as defined in claim 8, in which the low pressure side of the adjustable pressure regulator is connected to the outlet of the flow control, so that the regulator is subjected to a differential pressure and its action is independent of the absolute pressure.

14. An adjustable flow control as defined in claim 4, in which the low pressure outlet side of the adjustable pressure regulator is connected to the outlet of the flow control, so that the regulator is subjected to a differential pressure and its action is independent of the absolute pressure.

15. An adjustable flow control for metered flow of fluid, said flow control comprising a preliminary pressure regulator, an adjustable pressure regulator, and one or more restrictors supplied with fluid from the latter adjustable pressure regulator, said preliminary pressure regulator being used to reduce a supply pressure which may be excessive down to a desired working pressure for delivery to the adjustable pressure regulator, said adjustable pressure regulator having a means to adjust the same over a desired pressure range, said restrictors being friction tubes of large enough bore to avoid clogging, a plurality of shut off valves whereby a desired one or more of the restrictors may be connected to adjustable pressure regulator while the other restrictors are shut, and one or more of the restrictors being a cluster of collateral friction tubes arranged for parallel flow, the rate of flow being adjusted by means of the adjustable pressure regulator, the low pressure side of the regulators being connected to the outlet of the flow control, so that the regulators are subjected to a differential pressure independently of the absolute pressure, said regulators having a valve plug on a valve stem and bearing against a valve seat, the valve stem being effectively extended to form a plunger received in a cylinder on the opposite side of the seat, and an equalization passage from beneath the seat to the cylinder above the end of said plunger in order to compensate for the pressure exerted on the plug at the seat.

16. An adjustable flow control for metered slow flow of fluid, said flow control comprising an adjustable pressure regulator having an inlet to receive said fluid, and one or more restrictors having inlet ends supplied with fluid from the outlet of said regulator, said adjustable pressure regulator having a readily operable external control means to adjust the same over a desired pressure range, said restrictors being friction tubes of large enough bore to avoid clogging, and having outlet ends for delivering the metered fluid, the rate of flow being adjusted by means of the adjustable pressure regulator, said regulator having a valve plug on a valve stem and bearing against a valve seat, the valve stem being effectively extended to form a plunger received in a cylinder on the opposite side of the seat, and an equalization passage from beneath the seat to the cylinder above the end of said plunger in order to compensate for the pressure exerted on the plug at the seat.

17. An adjustable flow control for metered slow flow of fluid, said flow control comprising an adjustable pressure regulator having an inlet to receive said fluid and having a regulator spring, and one or more restrictors having inlet ends supplied with fluid from the outlet of said regulator, said adjustable pressure regulator having a readily operable external control means operable on said spring to adjust the same over a desired pressure range, said restrictors being friction tubes of large enough bore to avoid clogging, and having outlet ends for delivering the metered fluid, the rate of flow being adjusted by means of the adjustable pressure regulator, said regulator having a valve plug on a valve stem and bearing against a valve seat, the valve stem being effectively extended to form a plunger received in a cylinder on the opposite side of the seat, an equalization passage from beneath the seat to the cylinder above the end of said plunger in order to compensate for the pressure exerted on the plug at the seat, and a plurality of collateral push rods parallel to but offset from the axis of the stem for transmitting the force of the regulator spring to the stem.

18. An adjustable flow control for metered flow of fluid, said flow control comprising a preliminary pressure regulator having an inlet to receive said fluid and having a regulator spring, an adjustable pressure regulator having an inlet connected to the outlet of the preliminary pressure regulator and also having a regulator spring, and one or more restrictors having inlet ends supplied with fluid from the outlet of the latter adjustable pressure regulator, said preliminary pressure regulator being used to reduce a supply pressure which may be excessive down to a desired working pressure for delivery to the adjustable pressure regulator, said adjustable pressure regulator having a readily operable external control means operable on said spring to adjust the same over a desired pressure range, said restrictors being friction tubes of large enough bore to avoid clogging, and having outlet ends for delivering the metered fluid, the rate of flow being adjusted by means of the adjustable pressure regulator, said regulators each having a valve plug on a valve stem and bearing against a valve seat, the valve stem being effectively extended to form a plunger received in a cylinder on the opposite side of the seat, an equalization passage from beneath the seat to the cylinder above the end of said plunger in order to compensate for the pressure exerted on the plug at the seat, and a plurality of collateral push rods parallel to but offset from the axis of the stem for transmitting the force of the regulator spring to the stem.

References Cited

UNITED STATES PATENTS

| | | | |
|---|---|---|---|
| 1,787,686 | 1/1931 | Kerr | 137—501 |
| 2,057,150 | 10/1936 | Kehl et al. | 137—505.12 |
| 2,487,089 | 11/1949 | Anthes | 137—505.18 X |
| 2,608,209 | 8/1952 | Bryant | 137—501 |
| 2,821,210 | 1/1958 | Liley | 137—599 |
| 2,824,573 | 2/1958 | Mason et al. | 137—505.13 |
| 2,825,203 | 3/1958 | Bertin et al. | 138—44 X |
| 2,909,191 | 10/1959 | Horton | 137—501 |

M. CARY NELSON, *Primary Examiner.*

MARTIN SCHWARDRON, *Examiner.*

R. J. MILLER, *Assistant Examiner.*